UNITED STATES PATENT OFFICE.

THOMAS J. MAYALL, OF ROXBURY, MASSACHUSETTS.

IMPROVEMENT IN METHODS OF COMBINING EMERY WITH CAOUTCHOUC.

Specification forming part of Letters Patent No. 25,747, dated October 11, 1859.

*To all whom it may concern:*

Be it known that I, THOMAS J. MAYALL, of Roxbury, in the county of Norfolk and State of Massachusetts, have invented certain new and useful improvements in the process of making emery sharpening and polishing wheels and Tools of various kinds; and I do hereby declare that the following description forms a full and exact specification of the same, wherein I have set forth the nature and principles of my improvement, by which my invention may be distinguished from all others of a similar class, together with such parts as I claim and desire to have secured to me by Letters Patent.

The present process of manufacturing emery polishing-tools, as carried on under the Letters Patent granted to me bearing date of the 11th day of January, 1859, and the 17th day of May, 1859, consists in combining emery with india-rubber, sulphur, and olive-oil. By those processes I can only use a limited amount of emery, and the tools become clogged in using, while the action of the emery is impeded by the presence of the rubber; and in order to obviate these difficulties I have invented a new and improved process which enables me to use nearly double the proportion of emery which I formerly used and gives great strength to the tool when finished.

By my present improvement I can use a very large quantity of emery and very small proportion of rubber or gutta-percha and sulphur or other substances—viz., about fifteen pounds of emery to one pound of rubber or gutta-percha and five ounces of sulphur. These ingredients are perfectly combined and mixed together, and the composition thus formed is then placed in metallic molds and subjected to great pressure therein, and then heated from fifteen minutes to four hours at a temperature of 260° to 300° Fahrenheit. When the heating is performed in any manner much less time is required when a high pressure is used than when a low pressure only is obtained. The composition by this treatment becomes hard and durable, and enables me to form an emery tool in which the emery is the principal ingredient, and yet so firmly held by and incorporated with the rubber or gutta-percha or other substances as to prevent the composition from crumbling. The form and shape of the tool thus made can of course be endlessly varied by constructing the molds in which the composition is pressed and molded while being heated accordingly.

When it is desirable, olive-oil may be added to the composition, in the proportion of one-half pound of olive-oil to the quantities of rubber, sulphur, and emery above named; but the indispensable feature of this improvement is the great pressure, and heat under pressure, by which I am enabled to use the great proportion of emery above described. When it is desirable I employ other ingredients also to mix with the emery. Thus I take linseed-oil boiled to the consistency of thick pitch and combine it with emery and sulphur, in the proportion of two pounds of oil, fifteen pounds of emery, five ounces of sulphur. This composition is pressed into the molds very strongly and then submitted to the action of artificial heat from 260° to 300° Fahrenheit for about one hour. I have combined various other substances with emery for the above purposes. The best composition, however, is india-rubber or gutta-percha and sulphur, as above described, as that composition enables me to use the largest proportion of emery; but, whatever ingredients are to be used, a great pressure and a high degree of artificial heat are indispensable.

Having thus described my improvement, I wish it to be distinctly understood that I do not confine or restrict my invention to the particular composition of matter herein set forth, as by varying the proportions of the several ingredients or by adding or substituting others the same or similar results may be obtained, provided the essential feature of my invention—that is, submitting the emery compound while under pressure to the action of heat—be retained.

I therefore claim—

The new process herein described of making emery sharpening and polishing tools by combining emery with india-rubber, gutta-percha, or other substances, and then submitting the same while under great preasure to a high degree of artificial heat, substantially as set forth, whereby with a given quantity of rubber emery may be combined in much greater quantities than it could be heretofore done.

THOS. J. MAYALL.

Witnesses:
JOSEPH GAVETT,
ALBERT W. BROWN.